(12) United States Patent
Kitagawa et al.

(10) Patent No.: US 12,171,051 B2
(45) Date of Patent: Dec. 17, 2024

(54) OPTICAL HEATING DEVICE AND METHOD OF HEATING TREATMENT

(71) Applicant: Ushio Denki Kabushiki Kaisha, Tokyo (JP)

(72) Inventors: Tetsuya Kitagawa, Tokyo (JP); Takafumi Mizojiri, Tokyo (JP); Yoshiaki Nakamura, Tokyo (JP); Takehiko Yokomori, Tokyo (JP); Keita Kanazu, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 816 days.

(21) Appl. No.: 17/349,792

(22) Filed: Jun. 16, 2021

(65) Prior Publication Data

US 2022/0015213 A1 Jan. 13, 2022

(30) Foreign Application Priority Data

Jul. 10, 2020 (JP) ................................. 2020-118998

(51) Int. Cl.
| | |
|---|---|
| *H05B 47/16* | (2020.01) |
| *G01J 5/10* | (2006.01) |
| *G05D 23/20* | (2006.01) |
| *H05B 45/18* | (2020.01) |
| *H05B 47/155* | (2020.01) |

(52) U.S. Cl.
CPC ................ *H05B 47/16* (2020.01); *G01J 5/10* (2013.01); *G05D 23/20* (2013.01); *H05B 45/18* (2020.01); *H05B 47/155* (2020.01)

(58) Field of Classification Search
CPC ...... H05B 47/16; H05B 47/155; H05B 45/18; H05B 3/0047; G01J 5/10; G01J 5/0007;
(Continued)

(56) References Cited

U.S. PATENT DOCUMENTS

| | | | | |
|---|---|---|---|---|
| 2006/0065849 A1* | 3/2006 | Hwang | ................... | H01J 61/40 |
| | | | | 257/E21.349 |
| 2010/0267174 A1* | 10/2010 | Moffatt | ............. | H01L 21/67115 |
| | | | | 257/E21.135 |

(Continued)

FOREIGN PATENT DOCUMENTS

| | | |
|---|---|---|
| JP | 2002-261038 A | 9/2002 |
| JP | 2006-324389 A | 11/2006 |

(Continued)

OTHER PUBLICATIONS

An Office Action issued by Taiwan Intellectual Property Office on Dec. 19, 2023, which corresponds to Taiwanese Patent Application No. 110116695 and is related to U.S. Appl. No. 17/349,792; with English language translation.

(Continued)

*Primary Examiner* — Shawntina T Fuqua
(74) *Attorney, Agent, or Firm* — Studebaker & Brackett PC

(57) ABSTRACT

An optical heating device for heating a substrate includes:
a chamber for accommodating the substrate;
a pair of transmissive windows disposed on the wall of the chamber, the transmissive window facing each other for allowing light for heating to enter inside the chamber;
a support member for supporting the substrate to face each of the main surfaces of the substrate and the pair of transmissive windows each other;
a plurality of LED elements for emitting light toward the substrate supported by the support member;
a flash lamp for emitting light toward the substrate supported by the support member; and (Continued)

a first lighting control unit for controlling the lighting of the flash lamp after a predetermined time has elapsed since the time of lighting the LED elements.

20 Claims, 9 Drawing Sheets

(58) Field of Classification Search
CPC ........ G05D 23/20; G05D 23/27; Y02B 20/40; H01L 21/67115; H01L 21/324; H01L 21/67248

See application file for complete search history.

(56) References Cited

U.S. PATENT DOCUMENTS

| | | | | |
|---|---|---|---|---|
| 2014/0158674 | A1* | 6/2014 | Moffatt | B23K 26/352 219/385 |
| 2017/0309529 | A1 | 10/2017 | Aderhold et al. | |
| 2018/0261479 | A1* | 9/2018 | Ito | H01L 21/67248 |
| 2021/0366745 | A1 | 11/2021 | Furukawa et al. | |
| 2022/0214109 | A1* | 7/2022 | Yamada | F27D 11/00 |
| 2024/0105474 | A1* | 3/2024 | Kitazawa | H05B 3/0047 |
| 2024/0282600 | A1* | 8/2024 | Nakajima | H01L 21/68707 |

FOREIGN PATENT DOCUMENTS

| | | |
|---|---|---|
| JP | 2012-524400 A | 10/2012 |
| JP | 2018-148129 A | 9/2018 |
| JP | 2021-182582 A | 11/2021 |

OTHER PUBLICATIONS

An Office Action; "Notice of Reasons for Refusal," mailed by the Japanese Patent Office on Dec. 20, 2023, which corresponds to Japanese Patent Application No. 2020-118998 and is related to U.S. Appl. No. 17/349,792; with English language translation.

* cited by examiner

OPTICAL HEATING DEVICE AND METHOD OF HEATING TREATMENT

TECHNICAL FIELD

The present invention relates to an optical heating device and a method of heating treatment.

BACKGROUND ART

In the semiconductor manufacturing process, the ion implantation method, in which impurities are introduced into Si crystals by ion implantation, is commonly used. This method involves heating the semiconductor substrate to 1000° C. or higher in order to restore from crystal defects generated during the ion implantation.

In recent years, there has been a demand for forming thin impurity diffusion layers in the semiconductor manufacturing process, together with miniaturization and high integration, thus a heating device that can perform uniform heating treatment in a short time has been requested. Hence, an optical heating system using a flash lamp, for example, as described in Patent Document 1 below, is adopted for a heating treatment on semiconductor substrates during microfabrication process.

CITATION LIST

Patent Document

Patent Document 1: JP-A-2006-324389

SUMMARY OF INVENTION

Technical Problem

When a semiconductor substrate is instantaneously heated or cooled in a range between room temperature and 1,000° C. or higher, the semiconductor substrate suddenly expands and contracts in accordance with the temperature variation, which may cause the semiconductor substrate to warp and crack. Hence, the optical heating device described in Patent Document 1 above employs a configuration in which a halogen lamp is used to preheat the semiconductor substrate to a temperature at which the thermal diffusion of impurities is not an issue in the entire semiconductor substrate. This configuration enables variation in the temperature of the semiconductor substrate to reduce during the flash lamp heating, suppressing the semiconductor substrate from warping and cracking. Here, the term "preheating" refers to heating the semiconductor substrate to a predetermined temperature using another light source before the heating treatment with a flash lamp. In addition to the reason mentioned above, preheating is also performed for reducing the temperature gradient in the thickness direction of the semiconductor substrate.

The inventors of the present invention have extensively studied conventional optical heating devices for improvements, and found that the conventional optical heating devices have the following problems. Hereinafter, the details are described below with reference to the drawings.

FIG. 13 is a schematic view illustrating a configuration of a conventional optical heating device 100 provided with a chamber 101, flash lamps 102 and halogen lamps 103.

The chamber 101 includes a light transmissive window 104 to allow light emitted from the flash lamps 102 and the halogen lamps 103 to enter inside the chamber 101. The chamber 101 also includes a support base 105 to support a semiconductor substrate W1 to be heated in the chamber 101. In the case of vacuuming the chamber 101, the light transmissive window 104 is hermetically sealed with an O-ring or the like; however such a structure is omitted in FIG. 13.

The halogen lamps 103 are lit before the heating by the flash lamps 102 is performed, and preheat the semiconductor substrate W1 until its temperature stabilizes a predetermined temperature through the support base 105 and a heat transfer section 106.

Here, it will be explained how the temperature of the main surface W1a of the semiconductor substrate W1 varies and stabilizes in the preheating by the halogen lamps 103. FIG. 14 is a graph showing an example of the temperature of the main surface W1a of the semiconductor substrate W1 over time when the conventional halogen lamps 103 are used as a preheating source. As shown in FIG. 14, the semiconductor substrate W1 is preheated to stabilize the temperature of the main surface W1a at a target temperature (600° C. in the example of FIG. 14) by controlling the power supplied to the halogen lamps 103.

In the halogen lamp 103, the light output does not respond quickly to the variation of the input power; in other words, the halogen lamps 103 continues to emit high intensity light even after the power interruption. Hence, this slow response causes the temperature of the semiconductor substrate W1 to rise to a temperature higher than the target temperature, a phenomenon called overshooting as shown in FIG. 14.

Because of the overshoot, the preheating by the halogen lamps 103 is controlled to gradually converge the temperature of the main surface W1a of the semiconductor substrate W1 toward the target temperature while passing the target temperature many times (fluctuating around 600° C.) as shown in FIG. 14.

Next is explained a case in which the heating process using the flash lamps 102 is performed while the temperatures of the preheating being unstable. Heating by the flash lamps 102 under the unstable temperature causes the semiconductor substrate W1 to have variation in the thermal history (also known as the "thermal budget"), which is the history of variation in temperature of the semiconductor substrate.

The thermal history affects thermal diffusion that occurs in the semiconductor substrate, and especially in micro fabrication processes, the thermal history contributes to the formation of impurity diffusion layers. In other words, a large variation in the thermal history causes the impurity diffusion layer to form non-uniformly, and the characteristics of the devices formed on the substrate differ greatly from each semiconductor substrate. Hence, heating treatment by the flash lamps 102 under the unstable temperature of the preheating causes the characteristics of each semiconductor substrate to vary.

Therefore, in the case of preheating by the halogen lamps 103, the heating process using the flash lamp 102 should be performed when the temperature of the main surface W1a of the semiconductor substrate W1 is stabilized at the target temperature.

The overshoot described above can also be suppressed by reducing the power supplied to the halogen lamps 103 before reaching the target temperature. Moreover, a high performance power controller that controls the input power of the halogen lamps 103 may enable the light output to respond quickly to the variation of the input power.

FIG. 15 is a graph showing an example of the temperature of the main surface W1a of the semiconductor substrate W1 over time when the input power of the halogen lamps 103 is controlled using a high performance power controller. As shown in FIG. 15, the overshoot still occurs even with the high performance power control described above, thus the time T2 is required for the temperature to stabilize after the halogen lamps 103 starts to light. In FIG. 15, the graph in FIG. 14 is also overlaid in a dashed line for comparison.

In the recent semiconductor manufacturing industry, several hundreds of thousands to several millions of semiconductor substrates are manufactured annually at a single manufacturing site. There is an increasing market expectation for manufacturing devices and processing devices that reduce the tact time of processing each substrate by even one second.

In view of the above problem, it is an object of the present invention to provide an optical heating device and a heating treatment method that can heat and treat a semiconductor substrate in a shorter time.

Solution to Problem

An optical heating device for heating a substrate, the optical heating device comprising:
 a chamber for accommodating the substrate;
 a support member for supporting the substrate in the chamber;
 a plurality of LED elements for emitting light toward the substrate supported by the support member;
 a flash lamp for emitting light toward the substrate supported by the support member; and
 a first lighting control section for controlling the lighting of the flash lamp after a predetermined time has elapsed since the time of lighting the LED elements.

Compared with a halogen lamp, a LED device exhibits a quick light output response to the variation of the input power due to its light-emitting mechanism; the LED device can immediately reduce its brightness or stop emitting light when the current supplied to the LED device is reduced or stopped. Hence, the temperature rise beyond the target temperature can be suppressed by preheating the substrate with LED elements and controlling the light output from the LED elements to decrease or stop after the time expected to be required to reach the target temperature has elapsed. A flash lamp can be used for heating treatment immediately after reaching the target temperature.

In other words, the configuration described above allows the heating treatment of the substrate to be executed without waiting for the temperature to stabilize in the preheating process, thereby completing the heating treatment in a shorter time than before.

In the above optical heating device, the chamber may include a light transmissive window on its wall to allow light for heating to enter inside the chamber, the support member may support the substrate to face the main surface of the substrate and the light transmissive window each other, a plurality of the LED elements and the flash lamp may be disposed to emit light from outside the chamber toward the main surface of the substrate supported by the support member through the light transmissive window.

Since the LED elements and the flash lamp are disposed outside the chamber in the configuration described above, even in the case that the chamber being vacuumed or filled with a processing gas, the configuration prevents the light source from being damaged during operation. Moreover, the configuration requires fewer components to be placed in the chamber, thus reduces sources that may contaminate the substrate to be heated such as dusts and particles, resulting in achieving cleaner heating treatment.

In the optical heating device described above, a plurality of the LED elements may emit light toward one of the main surfaces of the substrate supported by the support member; and the flash lamp may emit light toward the other main surface of the substrate supported by the support member.

Furthermore, in the optical heating device described above, the chamber may include a pair of light transmissive windows facing each other for allowing light for heating to enter inside the chamber; the support member may support the substrate to face each of the main surfaces of the substrate and the pair of light transmissive windows each other; and a plurality of the LED elements and the flash lamp may be disposed to emit light from outside the chamber toward each of the main surfaces of the substrate supported by the support member through the light transmissive window.

The configuration described above allows the one main surface of the substrate accommodated in the chamber to be irradiated with a flash of light emitted from the flash lamp and the other main surface to be irradiated with the light emitted from the LED element. The configuration prevents the high intensity light emitted from the flash lamp from directly irradiating the LED elements.

As described in the configuration having a light transmissive window, the LED elements and the flash lamp are disposed outside the chamber in the configuration. This configuration prevents the light source from being damaged during operation, even in the case that the chamber being vacuumed or filled with a processing gas. Moreover, the configuration requires fewer components to be placed in the chamber, thus reduces sources that may contaminate the substrate to be heated such as dusts and particles, resulting in achieving cleaner heating treatment.

The optical heating device described above may include a radiation thermometer that measures a temperature of the main surfaces of the substrate. After lighting the LED elements, the first lighting control unit may control the lighting of the flash lamp after a predetermined time has elapsed since the time when the temperature of the main surfaces of the substrate measured by the radiation thermometer reaches a predetermined temperature.

The configuration described above allows the heating treatment by the flash lamp to be performed when the temperature of the main surface of the substrate reliably reaches the target temperature.

Furthermore, the optical heating device described above may include a second lighting control unit that controls the current supplied to the LED elements based on the temperature measured by the radiation thermometer. The second lighting control unit may start supplying the same current to each of the LED elements for lighting the LED elements. After lighting the LED elements, based on the temperature distribution on the main surface of the substrate measured by the radiation thermometer, the second lighting control unit may control to decrease the current supplied to the LED element that irradiates an area with light where the highest temperature is exhibited among the temperature distribution, and control to increase the current supplied to the LED element that irradiates an area with light where the lowest temperature is exhibited among the temperature distribution.

For example, in the case of heating a substrate by preheating, the temperature at the periphery of the substrate is prone to be lower than that at the center thereof. Hence, in the case that the multiple LED elements are used for preheating, supplying exactly the same current to all LED elements leads to a variation in the temperature profile across the entire substrate. This causes the process unevenness in the heating process by the flash lamp, resulting in warping and cracking of the substrate or a large variation in the characteristics of the elements formed on the same substrate.

The second lighting control section may control the current flowing through the LED elements in a zone, the zone constituting roughly one hundred LED elements and being segmented from the several thousands of LED elements entirely arranged. This control enables the temperature distribution of the substrate to be heated upon the preheating process to reduce the difference between the highest temperature part and the lowest temperature part, thereby suppressing the unevenness of the heating treatment on the substrate, warping and cracking thereof.

In the optical heating device described above, the substrate may be a semiconductor substrate or a glass substrate.

In the optical heating device described above, the light emitted from the multiple LED elements may include a main emission wavelength in the range from 300 nm to 1050 nm.

The term "main emission wavelength" in this specification refers to the wavelength at which the light emitted has the highest intensity.

In particular, a semiconductor substrate made of silicon (Si) have a high absorbance and a low transmittance for light having a wavelength range from ultraviolet to visible light; however, the absorbance rapidly decreases and the transmittance increases as the wavelength becomes longer than 1100 nm. As shown in FIG. 5, which will be referred to in the "Description of Embodiments", roughly 50% of the light having a wavelength of 1100 nm or higher passes through the semiconductor substrate.

In the case of a semiconductor substrate made of silicon, when light having a wavelength of 1100 nm or more irradiates the surface opposite to the main surface to be treated, a part of the light penetrates the semiconductor substrate and reaches the main surface to be treated. The penetrated light is absorbed on the main surface including the wiring formed thereon, causing variations in temperature distribution and possibly warping or cracking of the semiconductor substrate. For this reason, the light emitted from the LED elements preferably have the main emission wavelength of 1050 nm or less, in which the absorbance is 50% or more and the transmittance is 20% or less.

In addition, the absorbance of a semiconductor substrate made of silicon decreases approximately to 10% at its lowest point for light having a wavelength of less than 300 nm. Hence, it is preferable that the light emitted from the LED elements have a main emission wavelength of 300 nm or more in order to achieve an absorbance of at least 25% or more.

The above configuration prevents the light emitted from the LED elements from penetrating the semiconductor substrate and reaching the main surface to be treated. Therefore, the main surface to be treated is uniformly heated by the light emitted from the flash lamp, performing the heating treatment on the entire surface uniformly.

As shown in FIG. 4, which will be referred to in the "Description of Embodiments", a LED element has a narrower spectrum than a halogen lamp. This characteristic enables LED elements to be configured as a light source that emits light with high intensity only within the desirable wavelength range for preheating semiconductor substrates.

A method of heating treatment of the present invention is a method of heating treatment for a substrate. The method includes the following steps:

a step (A) of accommodating the substrate in a chamber;

a step (B) of lighting a plurality of LED elements emitting light toward the substrate accommodated in the chamber;

a step (C) of lighting a flash lamp emitting light toward the substrate, after the step (B), after a predetermined time has elapsed.

In the method of heating treatment described above, the step (C) may include a step of lighting the flash lamp, after starting the step (B), after a predetermined time has elapsed since the time when the temperature of the main surface of the substrate measured by the radiation thermometer reaches a predetermined temperature.

As described above, in the case of preheating with the light emitted from the LED elements, the flash lamp can be lit for heating treatment immediately after reaching the target temperature. The method described above allows the heating treatment of the substrate to be executed without requiring a waiting time for the temperature to stabilize in the preheating process, completing the heating treatment in a shorter time than before.

In the heating treatment method described above, each process may be conducted manually by an operator handling a switch or a button.

Advantageous Effects

The present invention provides an optical heating device and a heating treatment method that enable the heating treatment of substrates in a shorter time.

DESCRIPTION OF EMBODIMENTS

Hereinafter, embodiments of the optical heating device and the method of the heating process in accordance with the present invention will now be described with reference to the drawings. It is noted that the each of the following drawings related to the optical heating device is merely schematically illustrated. In other words, the dimensional ratios and the number of parts on the drawings do not necessarily match the actual dimensional ratios and the actual number of parts.

First Embodiment

Figure 1:
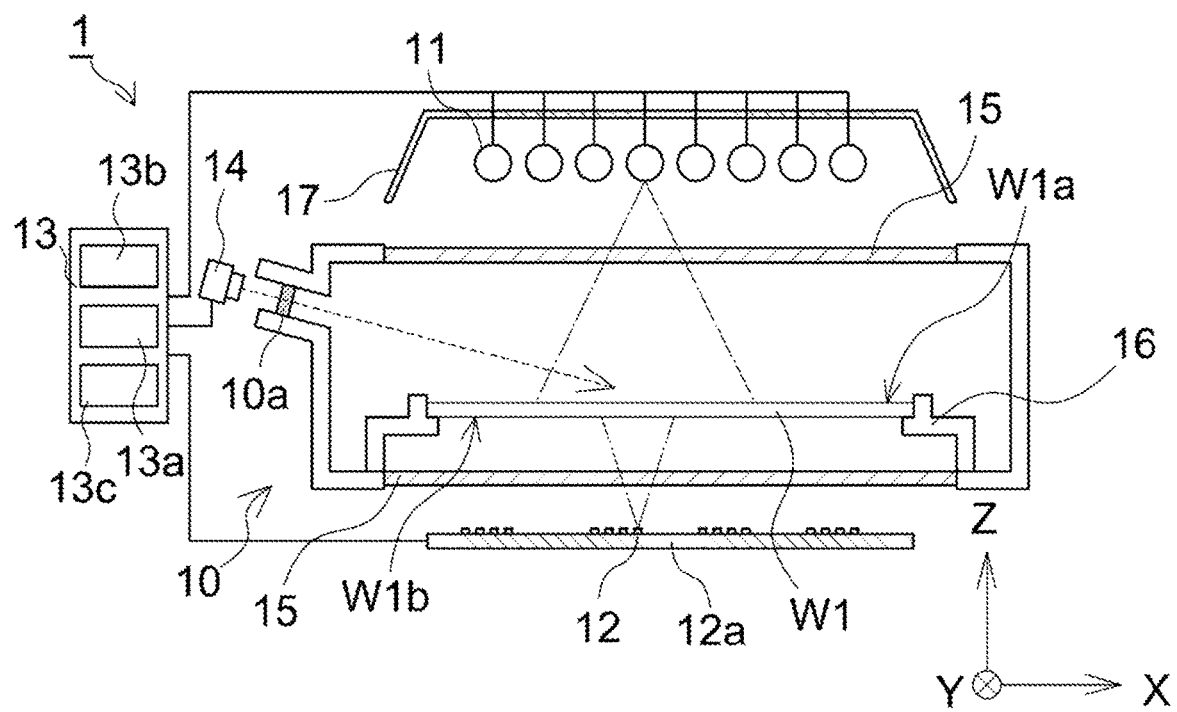
FIG. 1 is a schematic cross-sectional view of an optical heating device illustrating a configuration of an embodiment.
Figure 2:
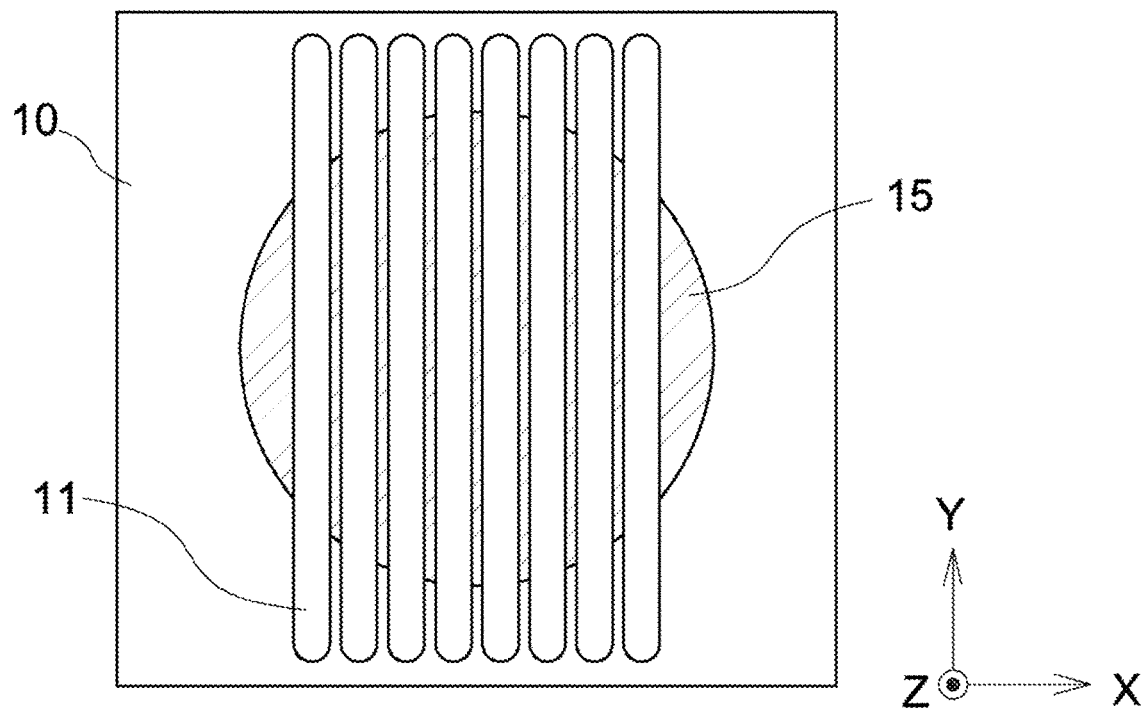
FIG. 2 is a plan view of the optical heating device in FIG. 1 viewed from the +Z side, excluding a reflector.

FIG. 1 is a schematic cross-sectional view of the optical heating device 1 illustrating an embodiment. FIG. 2 is a plan view of the optical heating device 1 in FIG. 1 viewed from the +Z side, excluding a reflector 17 described below. As shown in FIG. 1, the optical heating device 1 of the first embodiment is provided with a chamber 10 in which a semiconductor substrate W1 is accommodated, a plurality of flash lamps 11, a plurality of LED elements 12, a control section 13, and a radiation thermometer 14.

Hereinafter, as shown in FIGS. 1 and 2, the X direction is defined as a direction in which the flash lamps 11 are arranged, the Y direction as a direction in which the flash lamps 11 each extend, and the Z direction as a direction orthogonal to the X and Y directions. In the case of describing a direction to distinguish a positive direction from a negative direction, a positive or negative sign is added to the direction, such as "+Z direction" or "−Z direction". In the case of describing a direction without distinguishing a positive direction from a negative direction, the direction is simply expressed as "Z direction".

As shown in FIG. 1, a chamber 10 is provided with a support member 16 that supports a semiconductor substrate W1 inside. The support member 16 supports the semiconductor substrate W1 so as to place the main surfaces (W1$a$, W1$b$) of the semiconductor substrate W1 on the XY plane. The support member 16 can be any configuration as long as the main surfaces (W1$a$, W1$b$) of the semiconductor substrate W1 are placed on the XY plane; for example, the support member 16 may include a plurality of pin-shaped protrusions on which the semiconductor substrate W1 is supported at the points. Here, the main surface W1$a$ refers to a surface on which circuit elements, wirings, and so forth are formed, and the surface being irradiated with light emitted from the flash lamps 11; and the main surface W1$b$ refers to a surface that is irradiated with the light emitted from the LED elements 12 for preheating.

The chamber 10 is also provided with a pair of light transmissive windows 15 that face each other in the Z direction. The pair of light transmissive windows 15 each are provided to allow the light emitted from the flash lamps 11 or the LED elements 12 to enter the chamber 10. As shown in FIGS. 1 and 2, the chamber 10 has a rectangular parallelepiped shape; however it may have any other shapes including a cylindrical shape that is circular when viewed from the Z direction.

As shown in FIG. 1, each of the pair of light transmissive windows 15 is configured to face each of the main surfaces (W1$a$, W1$b$) of the semiconductor substrate W1 supported by the support member 16. In other words, the light emitted from the flash lamps 11 irradiates the main surface W1$a$ of the semiconductor substrate W1 through the light transmissive window 15 on the +Z side, whereas the light emitted from the LED elements 12 irradiates the main surface W1$b$ of the semiconductor substrate W1 through the light transmissive window 15 on the −Z side.

Furthermore, the optical heating device 1 is provided with a radiation thermometer 14 for monitoring the temperature of the main surface W1$a$ of the semiconductor substrate W1 through a monitoring window 10$a$ that is provided on the −X side wall of the chamber 10. As illustrated schematically by the dashed arrow in FIG. 1, the radiation thermometer 14 monitors the temperature of the main surface W1$a$ of the semiconductor substrate W1 through the monitoring window 10$a$.

When the flash lamps 11 are controlled to light up by a control section 13, they emit a flash of light toward the main surface W1$a$ of the semiconductor substrate W1. The flashed light emitted from the flash lamps 11 irradiates the main surface W1$a$ of the semiconductor substrate W1 through the light transmissive window 15 on the +Z side of the chamber 10, causing the semiconductor substrate W1 to be instantaneously heated to 1000° C. or higher.

A reflector 17 is provided on the +Z side of the flash lamps 11 to reflect the light traveling toward the opposite side (+Z side) of the chamber 10 back toward the chamber 10 side (−Z side). This configuration allows the light emitted from the flash lamps 11 to be irradiated onto the main surface W1$a$ of the semiconductor substrate more efficiently.

In the first embodiment, the multiple flash lamps 11 are arranged; however, if the intensity of the emitted light thereof is sufficiently high, the embodiment may include only one lamp or may omit the reflector 17.

Figure 3:
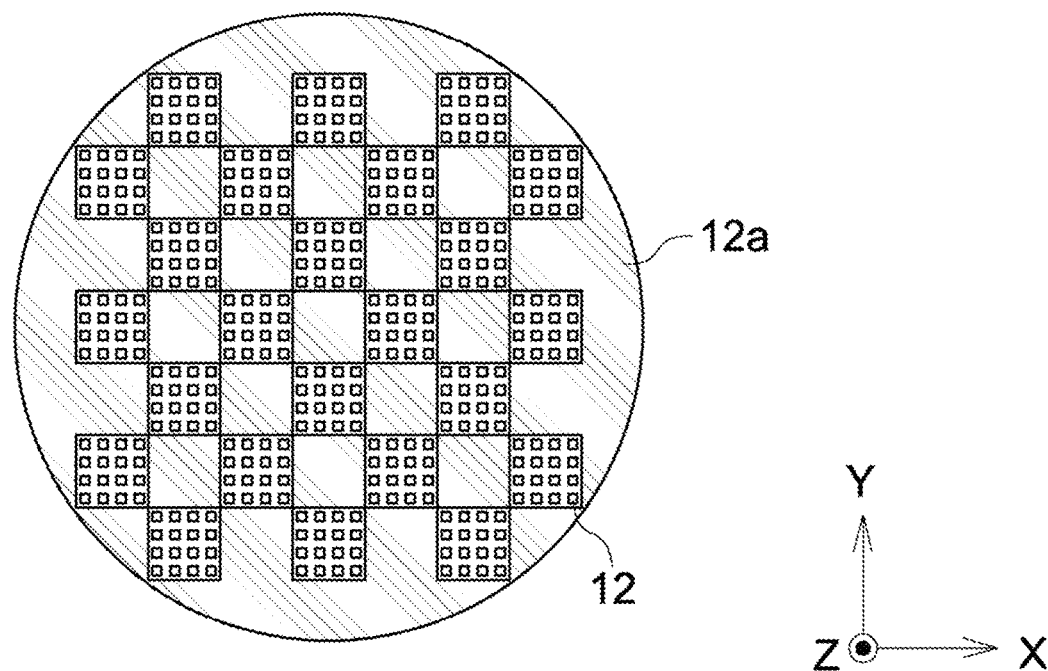
FIG. 3 is a plan view of an LED board in which LED elements are arranged, viewed from the +Z side.

FIG. 3 is a plan view of an LED board 12$a$ in which LED elements 12 are arranged, viewed from the +Z side. As shown in FIG. 3, the LED board 12$a$ has a plurality of LED elements 12 arranged on the XY plane, so that the light emitted from the LED elements 12 is directed to the light transmissive window 15 on the −Z side.

In the optical heating device 1 of the first embodiment, as shown in FIGS. 1 and 3, LED board 12$a$ has the multiple LED elements 12 arranged coplanarly thereon; however the LED board 12$a$ may constitute a curved surface and have the LED elements arranged thereon. The multiple LED boards 12$a$ may be provided in the optical heating device 1.

Figure 4:
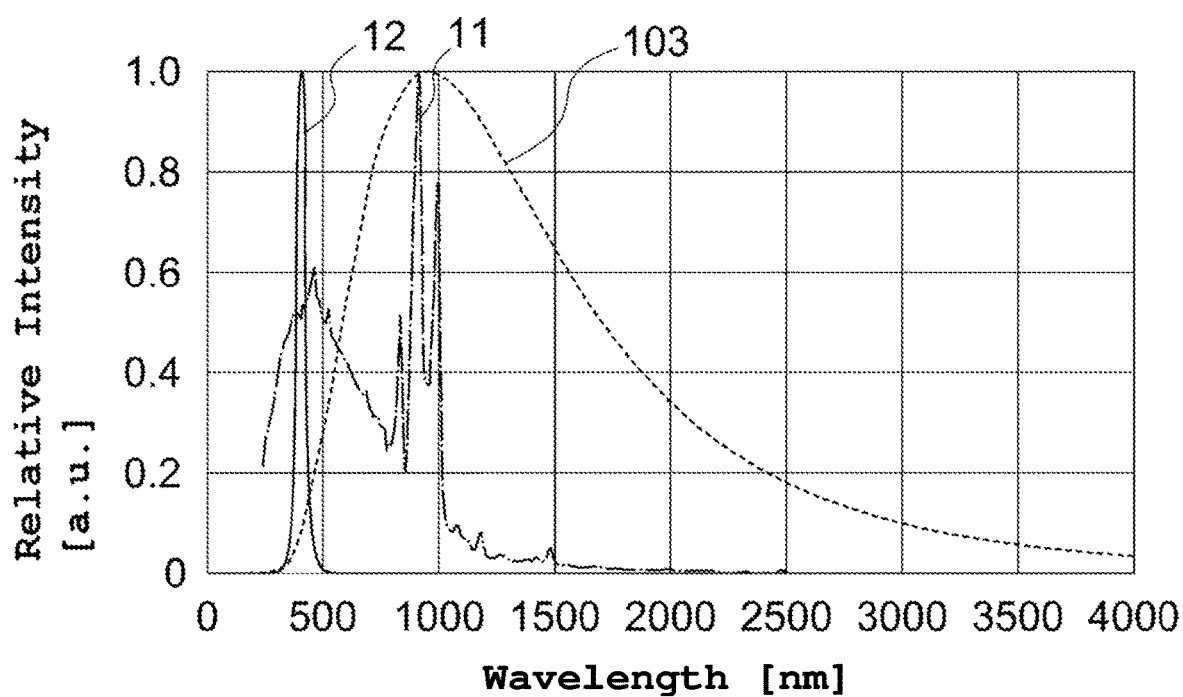
FIG. 4 is a graph illustrating the spectrum of light emitted from a flash lamp and an LED element.
Figure 5:
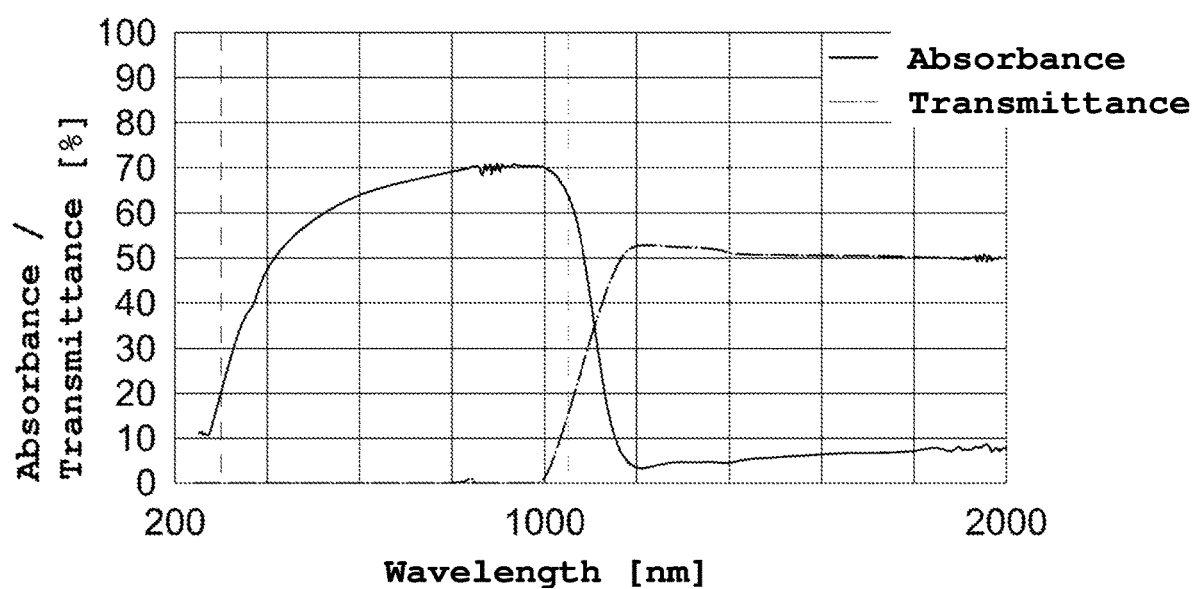
FIG. 5 is a graph illustrating the wavelength characteristics of the absorbance and transmittance of a semiconductor substrate made of silicon.

Here the spectrum of the light emitted from the flash lamps 11 and the LED elements 12 is explained. FIG. 4 is a graph illustrating the spectrum of light emitted from the flash lamps 11 and the LED elements 12. FIG. 5 is a graph illustrating the wavelength characteristics of the absorbance and transmittance of a semiconductor substrate W1 made of silicon. The graph shown in FIG. 4 indicates the relative intensity with the light intensity at the peak wavelength being normalized by 1. The graph shown in FIG. 5 indicates the absorbance and transmittance of a silicon substrate without any elements or wirings formed thereon. The spectrum of the halogen lamp 103 is also added in FIG. 4 with a dashed line for comparing with the conventional configuration.

As shown in FIG. 4, the light emitted from the LED elements 12 in the first embodiment has an emission spectrum with a main emission wavelength of 400 nm and a wavelength band of less than 100 nm, the wavelength band being defined as the wavelength band in which the relative intensity to the peak light intensity is more than 50%. In contrast, the light emitted from the flash lamps 11 has a broad emission spectrum with an emission wavelength band of more than 1000 nm.

As shown in FIG. 5, the semiconductor substrate W1 made of silicon has an absorbance that exceeds the transmittance in the wavelength band below 1100 nm, and has a transmittance that exceeds the absorbance in the wavelength band above 1100 nm. Hence, in order to efficiently heat the semiconductor substrate W1 made of silicon, it is preferable that the LED elements 12 used for preheating have a main emission wavelength of 1050 nm or less, at which the absorbance is 50% or more and the transmittance is 20% or less.

The semiconductor substrate W1 made of silicon has a significantly low absorbance for in the wavelength range of less than 300 nm. Thus, it is preferable that LED elements 12 have a main emission wavelength of 300 nm or more.

As shown in FIG. 4, the light emitted from the halogen lamps 103 has a broad emission spectrum with an emission wavelength band of more than 1000 nm, similar to that of the flash lamps 11. Hence, in the conventional preheating using the halogen lamps 103, light in the wavelength band of 1100 nm or more that transmits through the semiconductor substrate W1 is irradiated to the main surface W1$b$ of the semiconductor substrate W1 with high intensity.

The control section 13 is provided with a first lighting control unit 13$a$ to control the lighting of the flash lamps 11, a second lighting control unit 13$b$ to control the lighting of the LED elements 12, and a timer 13$c$ to measure the time elapsed immediately after the LED elements 12 starts lighting. When the timer 13$c$ detects that a predetermined time has elapsed since the LED element 12 started lighting, the first lighting control unit 13$a$ controls the lighting of the flash lamps 11. The preferred control details of the second lighting control unit 13$b$ will be described later. The timer 13$c$ may be provided separately from the optical heating device 1.

Figure 6:
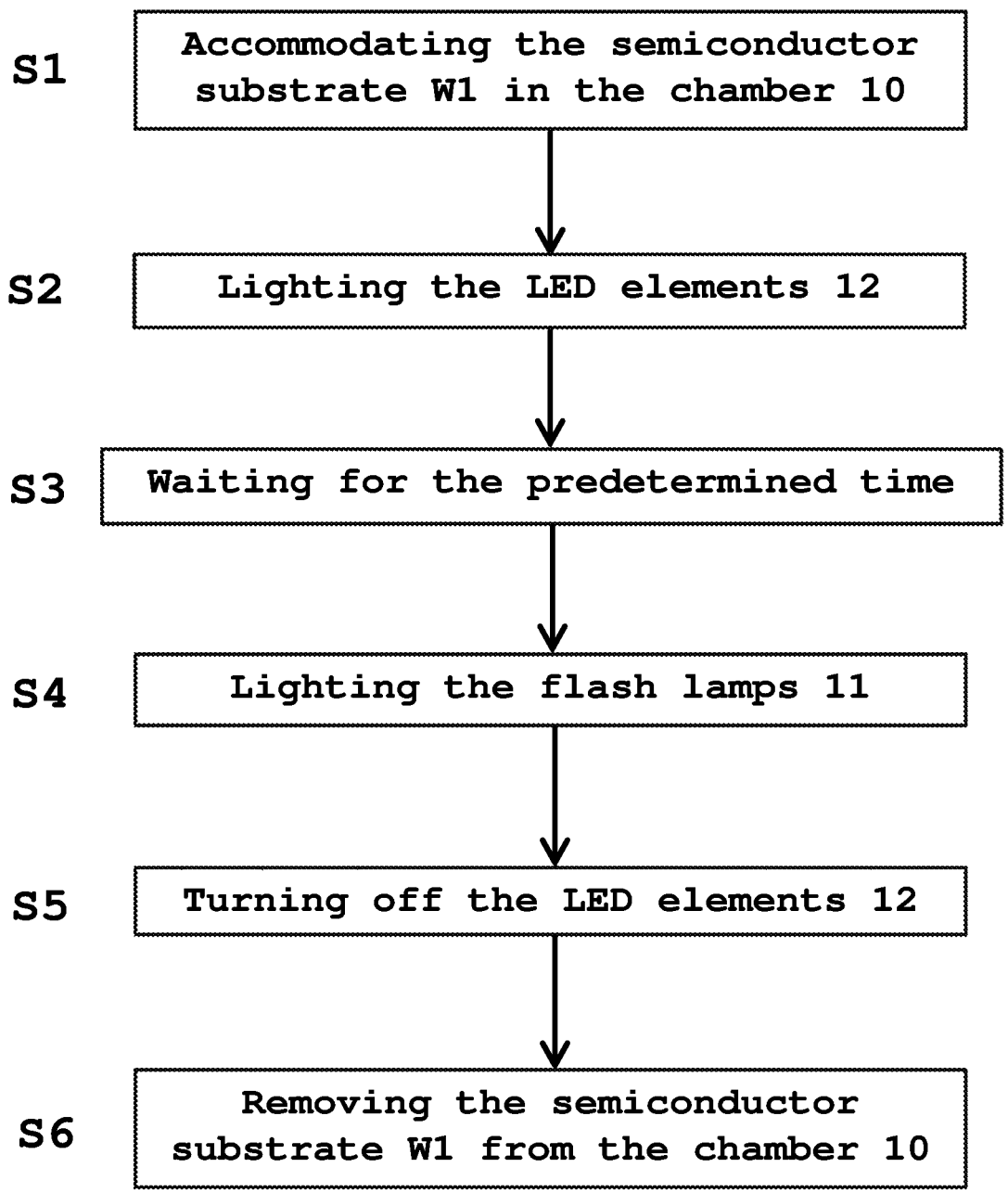
FIG. 6 is a flowchart illustrating the sequence of a heating treatment process using the optical heating device.
Figure 7:
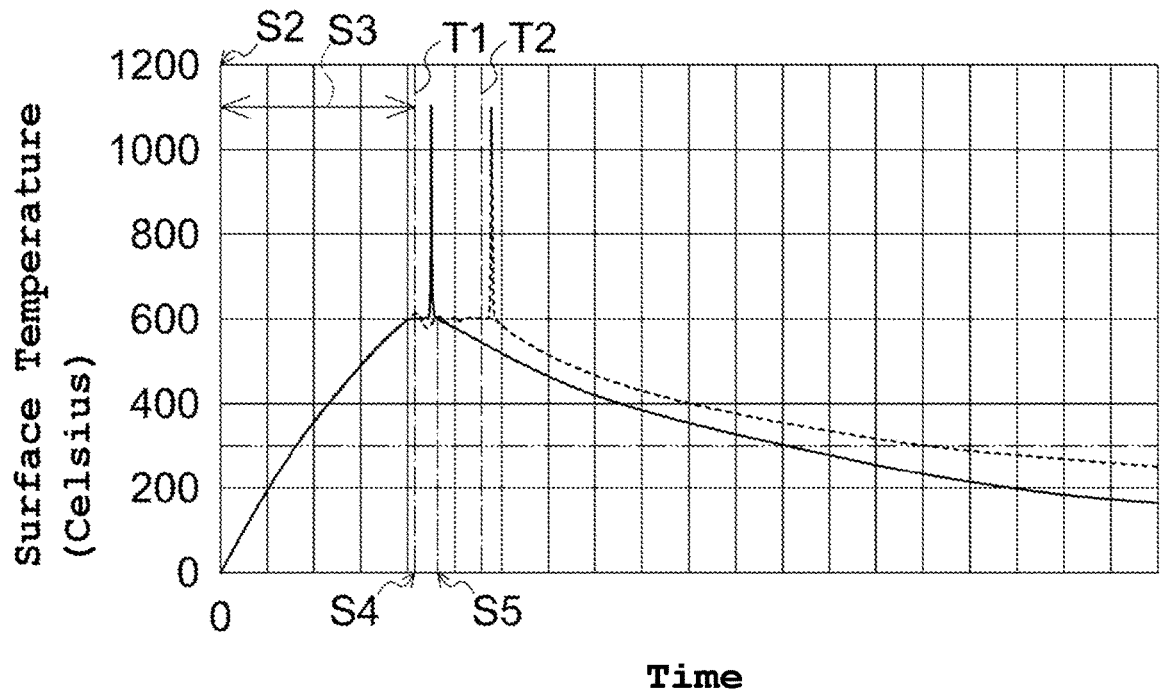
FIG. 7 is a graph illustrating a variation in temperature of the main surface of a semiconductor substrate during the heating treatment with the optical heating device.
Figure 13:
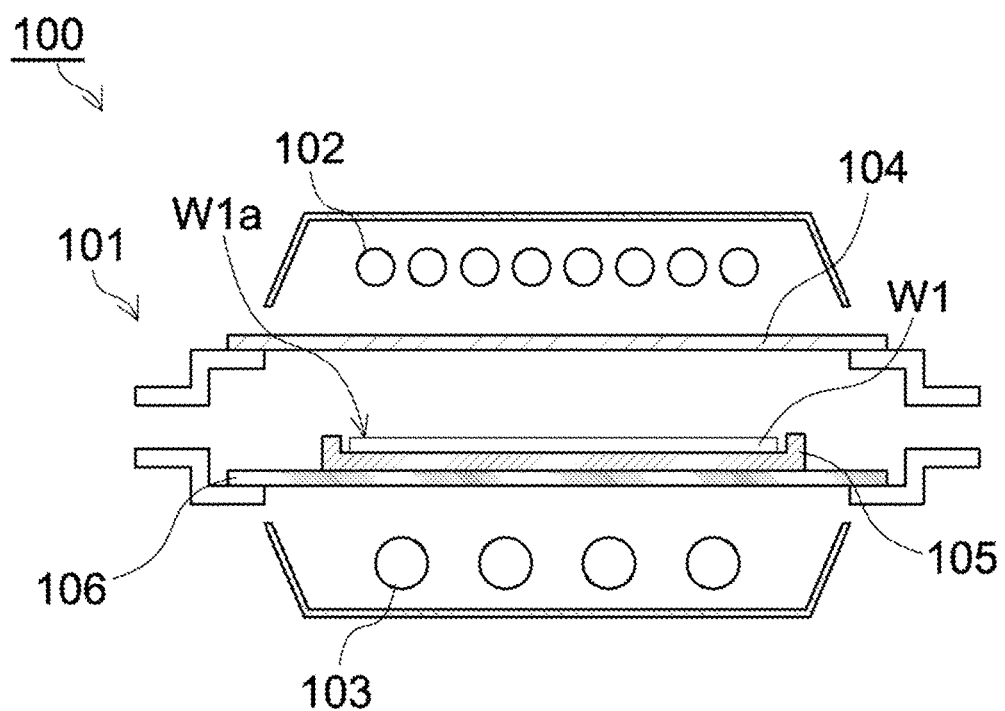
FIG. 13 is a schematic cross-sectional view of a conventional optical heating device provided with a flash lamp and a halogen lamp.
Figure 14:
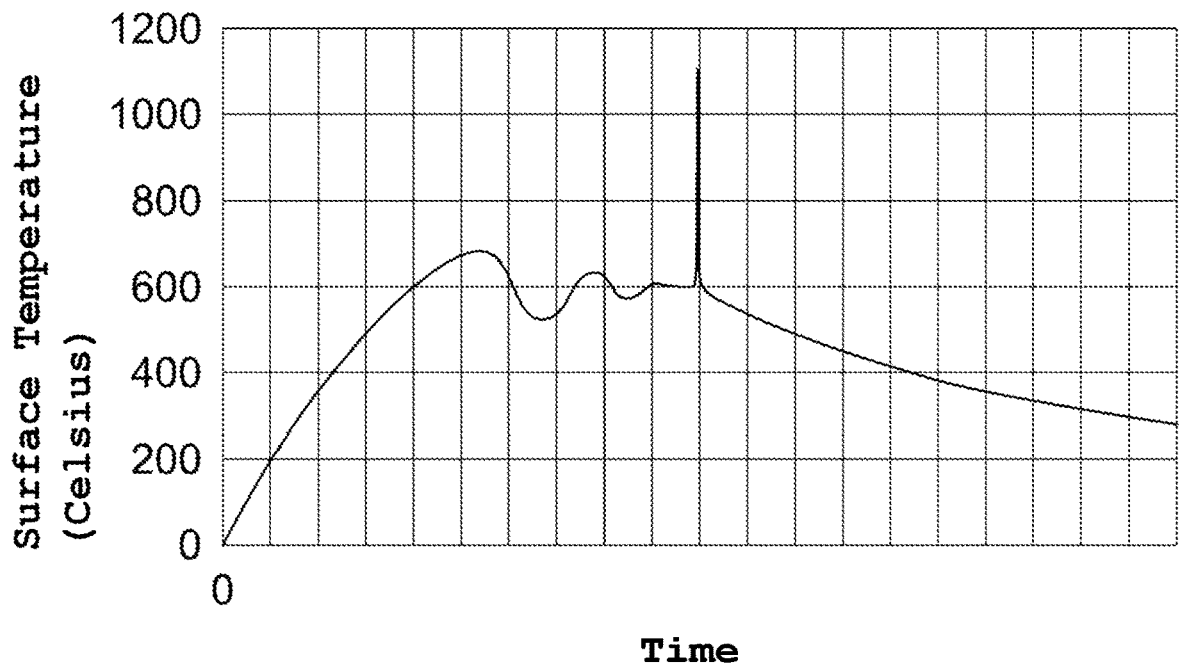
FIG. 14 is a graph illustrating an example of a variation in temperature of the main surface of a semiconductor substrate as a function of time when the halogen lamp is used as a preheating source in the conventional optical heating device.
Figure 15:
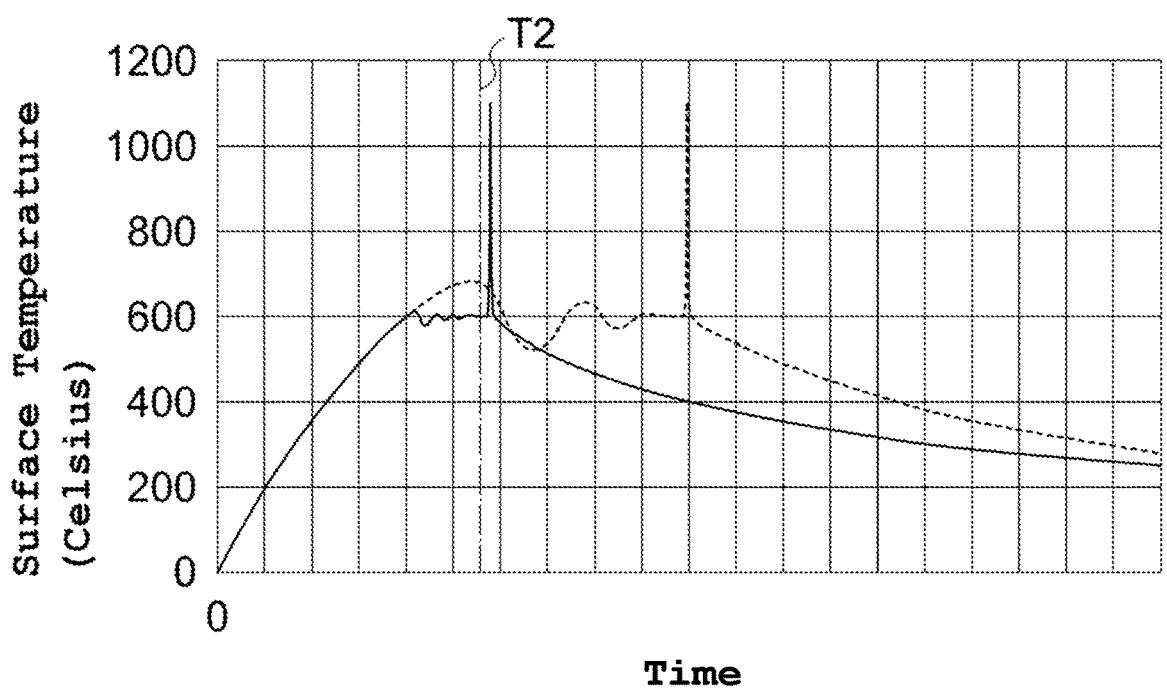
FIG. 15 is a graph illustrating an example of a variation in temperature of the main surface of a semiconductor substrate as a function of time when the input power of the halogen lamp is controlled using a high-performance power controller.

Hereinafter, each process of the heating treatment of the semiconductor substrate W1 performed by the optical heating device 1 of the first embodiment will be described. FIG. 6 is a flowchart illustrating the sequence of a heating treatment process using the optical heating device 1. FIG. 7 is a graph illustrating a variation in temperature of the main surface W1$a$ of a semiconductor substrate W1 during the heating treatment with the optical heating device 1. For the comparison with the conventional configuration shown in FIGS. 13 and 14, FIG. 7 also adds a graph with a dashed line, which illustrates a variation in temperature of the main surface W1$a$ of the semiconductor substrate W1 in the heating treatment by the conventional optical heating device 100.

As shown in FIG. 6, the semiconductor substrate W1 is first accommodated in the chamber 10 (step S1). This step S1 corresponds to a process (A).

After the execution of the step S1, the second lighting control unit 13$b$ controls the LED elements 12 to start supplying current to the LED elements 12, and lights the LED elements 12 to start preheating (step S2). This step S2 corresponds to a process (B).

After the execution of the step S2, the timer 13$c$ starts measuring the elapsed time and waits until the time T1 has elapsed for the semiconductor substrate W1 to reach the target temperature, as shown in FIG. 7 (step S3). The time T1 is determined properly in accordance with, for example, the size and thickness of the semiconductor substrate W1. The setting shown in FIG. 7 is a mere example; however, the time T1 can be set shorter than the stability waiting time T2 in the case of controlling the input power of the halogen lamps using a high-performance power controller.

When the timer 13$c$ detects that the predetermined time has elapsed, the first lighting control unit 13$a$ controls the lighting of the flash lamps 11 (Step S4). This step S4 corresponds to a process (C). At this time, the second lighting control unit 13$b$ may control to decrease the current supplied to the LED elements 12 in order to suppress the temperature rise of the LED elements 12.

After the execution of the step S4, the second lighting control unit 13$b$ stops supplying current to turn off the LED elements 12 (step S5).

The LED elements 12 are a light source for preheating the semiconductor substrate W1, and are not necessarily lit when the flash lamps 11 is lit. In other words, in this embodiment, the step S5 is performed after the step S4 is executed; however the step S5 may be performed at the same time as the lighting control of the flash lamps 11 in the step S4, or immediately before the step S4.

After the execution of step S5, when the temperature of the semiconductor substrate W1 has dropped to a temperature sufficient for removing from the chamber 10, the semiconductor substrate W1 is removed (step S6).

At this step 6, whether the temperature in the chamber 10 has dropped to a temperature at which the semiconductor substrate W1 can be removed may be determined by the radiation thermometer 14, or by the timer 13$c$ that detects whether a predetermined time has elapsed. The temperature of the semiconductor substrate W1 for removing from the chamber 10 is set appropriately according to, for example, the configuration of the equipment. The temperature is indicated as a double-dotted dashed line in FIG. 7; however, this setting is a mere example.

The configuration described above allows the light irradiation by the flash lamps 11 to be executed without requiring a waiting time for the temperature to stabilize in the preheating process, shortening the heating treatment time by several seconds to several tens of seconds compared with the conventional optical heating device.

In addition, the control section 13 controls the lighting of the LED elements 12 to reduce the unevenness in temperature of the semiconductor substrate W1 in the preheating process. Hence, variation in the temperature distribution of the semiconductor substrate W1 is reduced, thereby suppressing the unevenness of the heating treatment on the substrate, warping and cracking thereof.

Furthermore, since the LED elements 12 have a main emission wavelength of 400 nm in the first embodiment, the light emitted from the LED elements 12 hardly reaches the main surface W1$a$ of the semiconductor substrate W1 for the reasons described above. Thus, this configuration can suppress the variation in temperature distribution due to the light absorbed by the circuit elements and wirings.

In the step S2, the second lighting control unit 13$b$ may decrease or increase the power supplied to a specific LED element 12 out of the multiple LED elements 12 to control the brightness of each LED element.

Specifically, after starting to supply the same current to each of the LED elements 12, the second lighting control unit 13b controls to decrease the current supplied to the LED elements 12 that irradiate an area with light where the highest temperature is exhibited among the temperature distribution of the main surface W1a of the semiconductor substrate W1 measured by the radiation thermometer 14. The second lighting control unit 13b may also control to increase the current supplied to the LED elements 12 that irradiate an area with light where the lowest temperature is exhibited among the temperature distribution thereof.

Figure 8A:
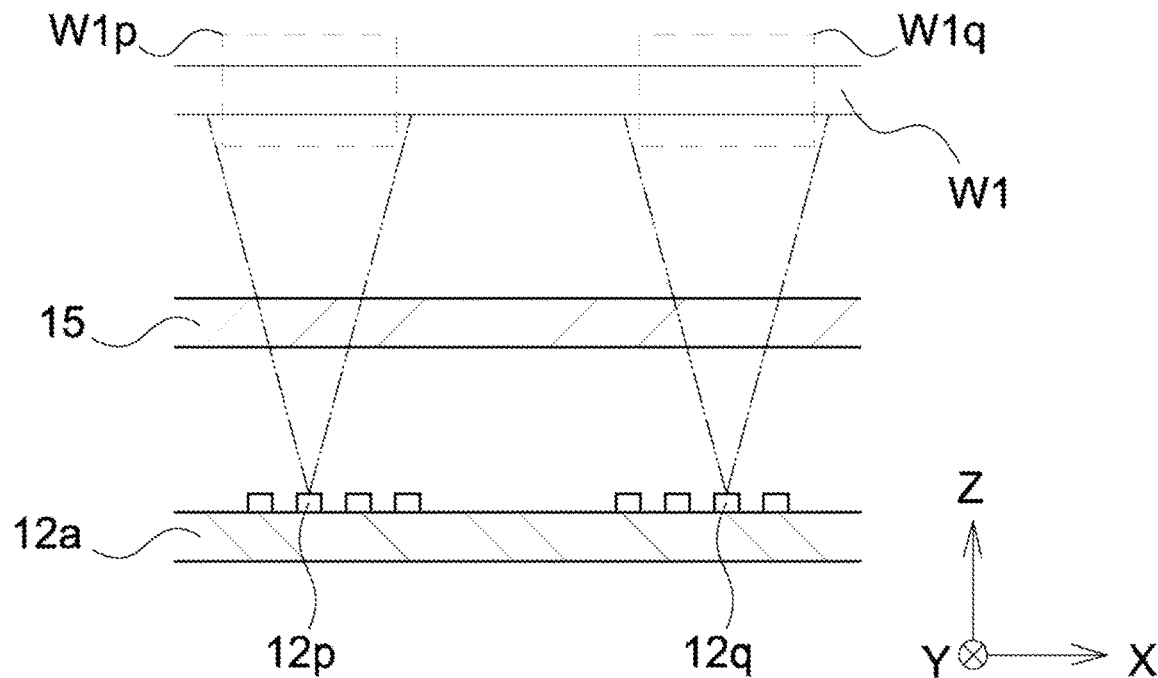
FIG. 8A is an enlarged cross-sectional view near an LED board of the optical heating device in FIG. 1, illustrating an example of the relation between the area of the semiconductor substrate and the LED elements.

FIG. 8A is an enlarged cross-sectional view near the LED board 12a of the optical heating device 1 in FIG. 1, illustrating an example of the relation between area (W1p, W1q) of the semiconductor substrate W1 and LED elements (12p, 12q). As shown in FIG. 8A, the control described above associates each region (W1p, W1q) of the main surface W1a of the semiconductor substrate W1 with each LED element (12p, 12q) that irradiates the corresponding region (W1p, W1q) on the main surface W1a. The second lighting control unit 13b controls the current supplied to each LED element (12p, 12q) according to the temperature of each region (W1p, W1q). For convenience of explanation, FIG. 8A illustrates only with respect to the X direction; however, each region in the XY plane of the semiconductor substrate W1 is associated with corresponding LED elements 12 arranged on the LED board 12a.

Figure 8B:
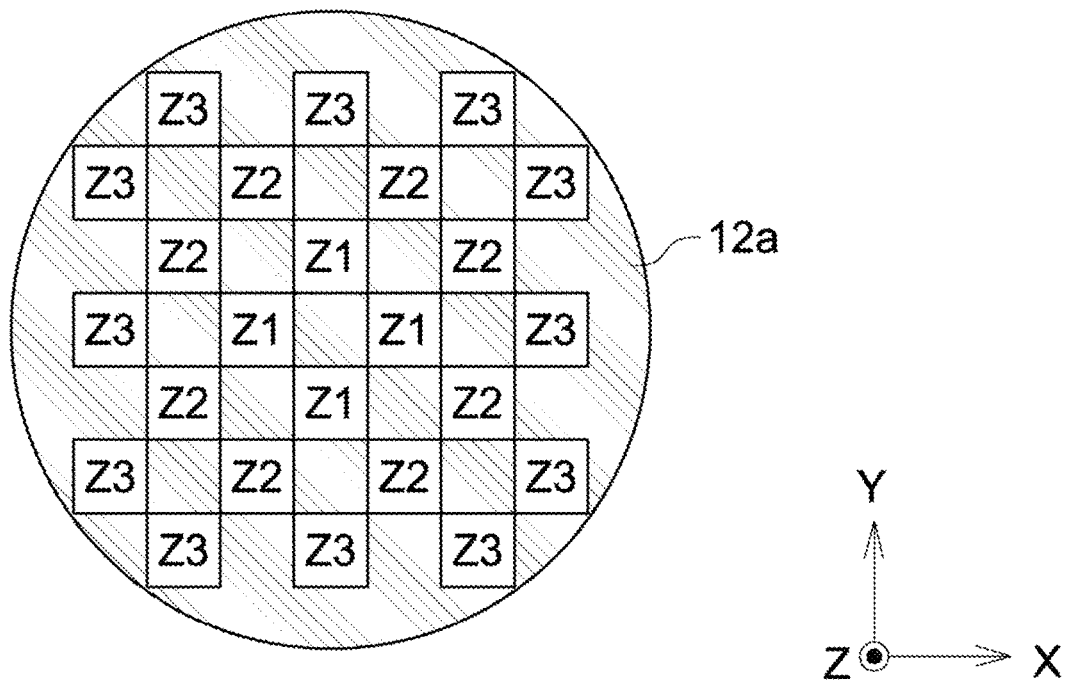
FIG. 8B is a plan view of the LED board illustrating an example of segmenting the LED board into multiple zones.

FIG. 8B is a plan view of the LED board 12a illustrating an example of segmenting the LED board 12a into multiple zones (Z1, Z2, Z3). Another control method different from that described with reference to FIG. 8A is, for example, to segment the LED board 12a into several zones (Z1, Z2, Z3) as shown in FIG. 8B, and the second lighting control unit 13b controls the current supplied to a group of LED elements in each zone (Z1, Z2, Z3). In this method, the second lighting control unit 13b controls to decrease the current supplied to the group of LED elements that irradiate a zone with light, the zone indicating the highest temperature in the temperature distribution of the main surface W1a of the semiconductor substrate W1 measured by the radiation thermometer 14.

Even in the case of this control method, on each LED element 12 being considered individually, the second lighting control unit 13b controls to decrease the current supplied to the LED element 12 that irradiates an area with light, the area where the highest temperature is exhibited among the temperature distribution of the main surface W1a of the semiconductor substrate W1 measured by the radiation thermometer 14. In this control method, the second lighting control unit 13b may also control to increase the current supplied to the group of LED elements 12 that irradiate an area with light, the area where the lowest temperature is exhibited among the temperature distribution of the main surface W1a of the semiconductor substrate W1 measured by the radiation thermometer 14.

The optical heating device 1 is configured to allow the second lighting control unit 13b to control the lighting of the LED elements 12 collectively, and may not be provided with the radiation thermometer 14. In the optical heating device 1 of the first embodiment as shown in FIG. 1, the radiation thermometer 14 is configured to be provided outside the chamber 10 to measure the temperature of the main surface W1a of the semiconductor substrate W1 through the monitoring window 10a; however the radiation thermometer 14 may be provided inside the chamber 10.

In the above description, the subject of the heating treatment is a semiconductor substrate W1 made of silicon; however, the optical heating device 1 can be used for heating any semiconductor substrates other than the semiconductor substrate W1 made of silicon, and even for heating any material substrates other than semiconductor substrates, for example, glass substrates in the display manufacturing process.

The LED elements 12 mounted on the optical heating device have a narrow wavelength band of 100 nm or less, the wavelength band being defined as the wavelength in which the relative intensity to the peak light intensity is 50% or more. Hence, from the viewpoint of heating efficiency, it is desirable to select the main emission wavelength of the emitted light appropriately according to the absorption spectrum of the subject to be heated.

Second Embodiment

The configuration of the optical heating device 1 according to the second embodiment of the present invention will be described mainly on the points that differ from those of the first embodiment.

Figure 9:
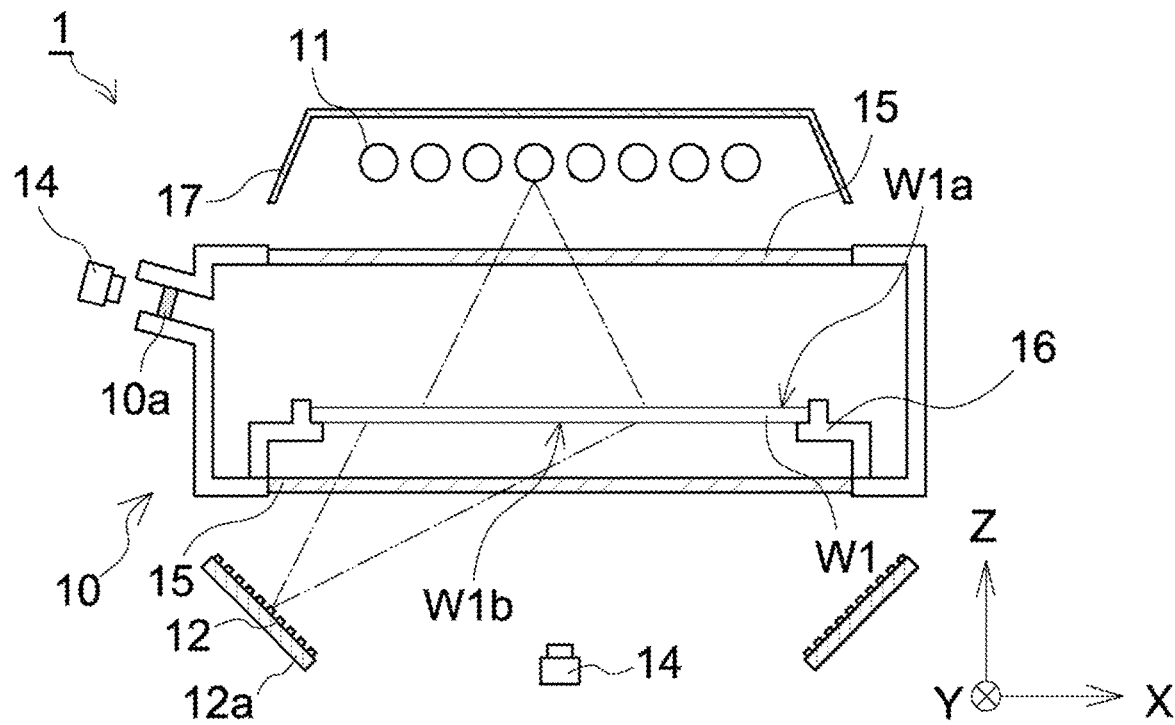
FIG. 9 is a schematic cross-sectional view of an optical heating device illustrating a configuration of another embodiment.
Figure 10:
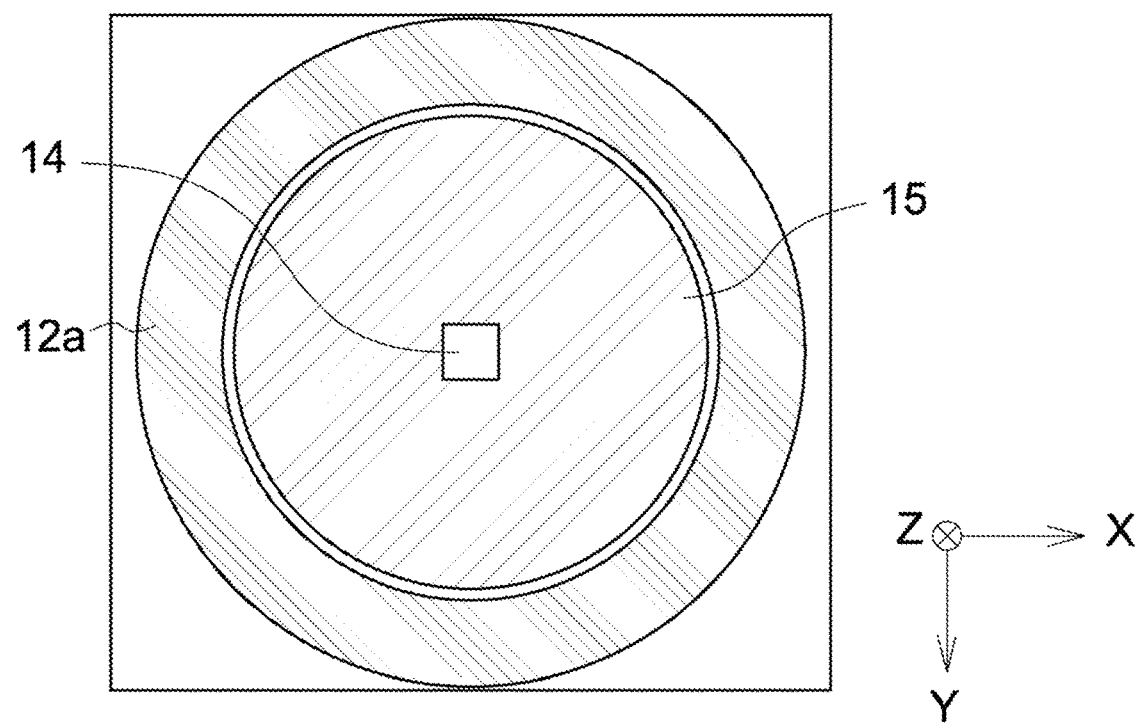
FIG. 10 is a plan view of the optical heating device in FIG. 9 viewed from the −Z side.

FIG. 9 is a schematic cross-sectional view of an optical heating device illustrating another embodiment of the present invention. FIG. 10 is a plan view of the optical heating device in FIG. 9 viewed from the −Z side. As shown in FIG. 10, the second embodiment of the optical heating device 1 has the LED board 12a formed in a circular shape when viewed in the Z direction.

The optical heating device 1 of the second embodiment is also provided with a control section 13 similar to the first embodiment; however, the control section 13 is omitted in FIG. 9 to avoid a complicated illustration.

The plane of the LED board 12a on which the LED elements is arranged is inclined to the XY plane, and the light emitted from the LED elements 12 is irradiated to the main surface W1b of the semiconductor substrate W1 from a direction that is not parallel to the Z direction.

The above configuration of the optical heating device 1 enables the inside of the chamber 10 to be observed from the light transmissive window 15 located at the −Z side through the inside of the LED board 12a. For example, it is possible to check whether the semiconductor substrate W1 accommodated in the chamber 10 is detached from the support member 16. As shown in FIGS. 9 and 10, a radiation thermometer 14 may also be disposed on the −Z side of the chamber 10 to measure the temperature of the main surface W1b of the semiconductor substrate W1.

Monitoring the temperature of the main surface W1b, which is irradiated with light emitted from the LED elements 12, allows the second lighting control unit 13b to control the current supplied to the LED elements 12 based on the temperature distribution of each main surface (W1a, W1b), thus suppressing the unevenness in temperature of the entire semiconductor substrate W1.

OTHER EMBODIMENTS

Hereinafter, other embodiments are described.

In the above embodiment, the flash lamps 11 and the LED elements 12 are disposed on opposite sides as seen from the semiconductor substrate W1; however the optical heating device 1 may also have the flash lamps 11 and the LED elements 12 disposed on the same side as seen from the semiconductor substrate W1. In the above embodiment, the flash lamps 11 and LED elements 12 are disposed outside the chamber 10 and emit light toward the semiconductor substrate W1 through the light transmissive windows 15 of the chamber 10; however, the flash lamps 11 and LED elements 12 may be disposed inside the chamber 10, and no light transmissive window 15 may be provided in the chamber 10.

Figure 11:
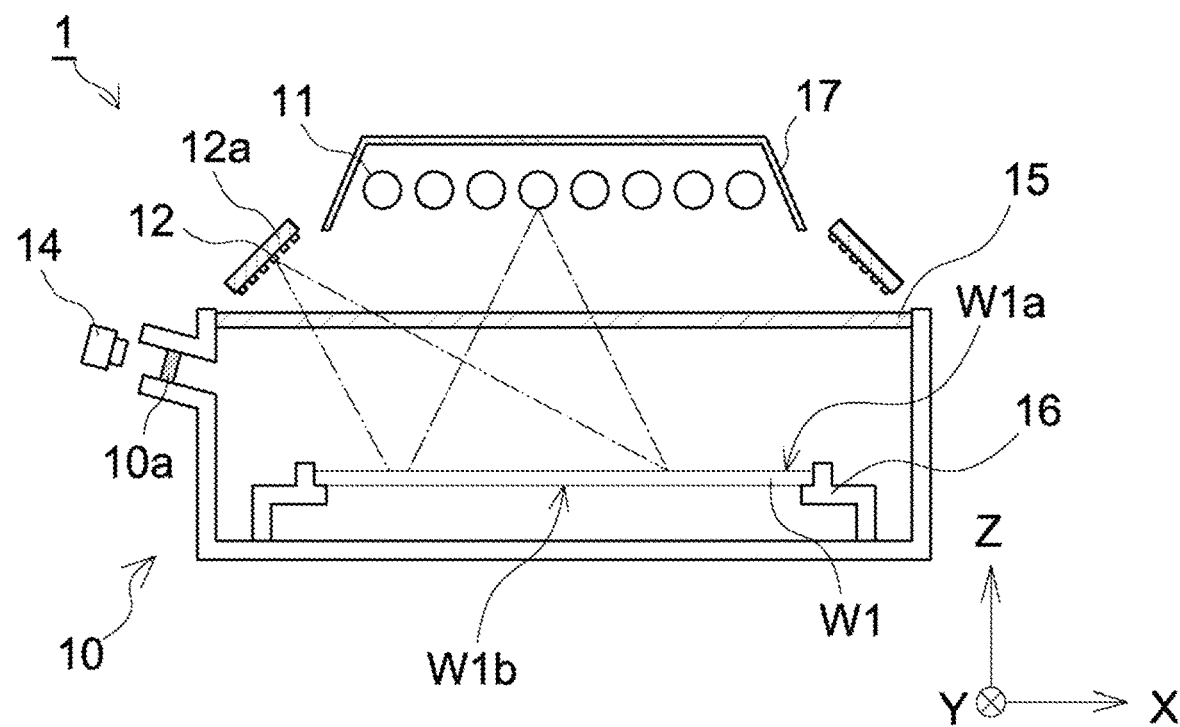
FIG. 11 is a schematic cross-sectional view of an optical heating device illustrating a configuration of still another embodiment.
Figure 12:
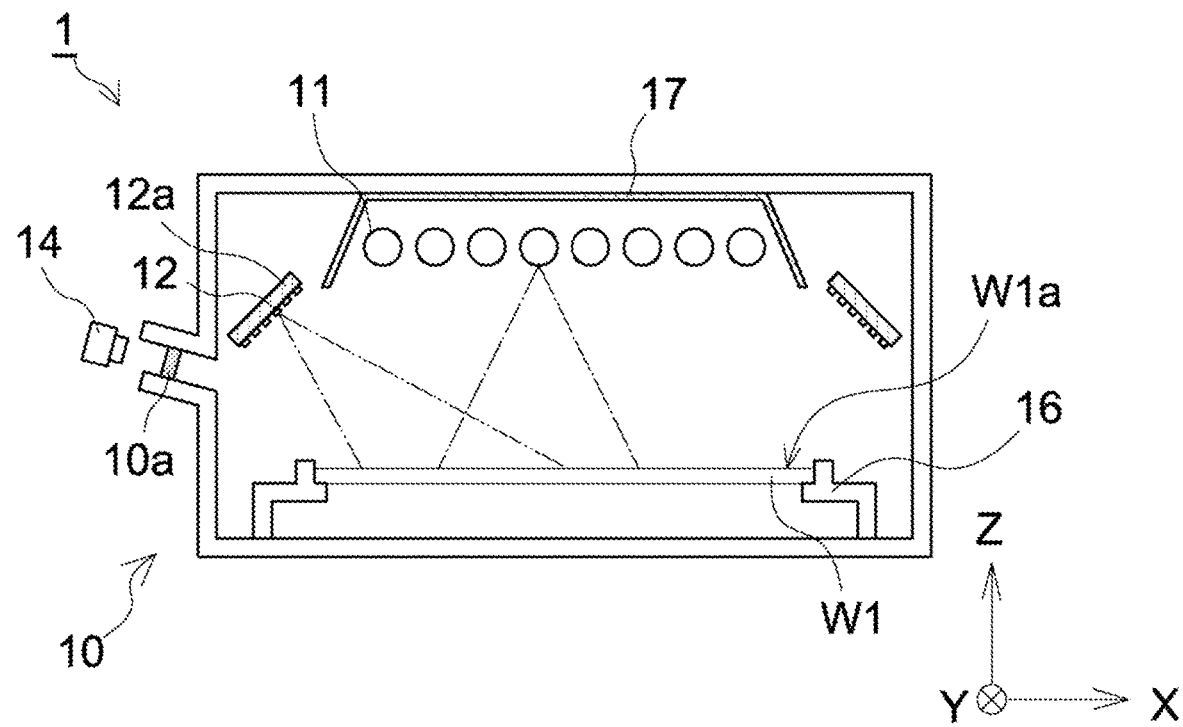
FIG. 12 is a schematic cross-sectional view of an optical heating device illustrating a configuration of still another embodiment.

FIGS. 11 and 12 are schematic cross-sectional views of an optical heating device illustrating other embodiments. As shown in FIG. 11, the optical heating device 1 may also have the flash lamps 11 and the LED elements 12 arranged on the same side as seen from the semiconductor substrate W1. As shown in FIG. 12, the flash lamps 11 and LED elements 12 may be disposed inside the chamber 10, and no light transmissive window 15 may be provided in the chamber 10.

<2> In the above embodiment, the timer 13c measures the elapsed time after the execution of the step S2, and the step S4 is executed after this elapsed time reaches the predetermined time T1. However, as an alternative to this control procedure, the first lighting control unit 13a may be configured to control the lighting of the flash lamps 11 when the temperature of the main surface W1a of the semiconductor substrate W1 measured by the radiation thermometer 14 rises to a predetermined temperature after the execution of the step S2. In this case, the "predetermined time" refers to the time required, after the execution of step S2, for the temperature of the main surface W1a of the semiconductor substrate W1 to reach the predetermined temperature. The "predetermined temperature" here may refer to the target temperature of the semiconductor substrate W1.

<3> The optical heating device 1 may be provided with an optical system including a lens, a prism, a diffuser plate or an integrator optics, to irradiate uniformly the entire main surface W1b of the semiconductor substrate W1 with the light emitted from the LED elements 12.

<4> The configuration of the optical heating device 1 described above is merely an example, and the present invention is not limited to each configuration shown in the figures.

What is claimed is:

1. An optical heating device for heating a substrate, the optical heating device comprising:
    a chamber for accommodating the substrate;
    a support member for supporting the substrate in the chamber;
    a plurality of LED elements for emitting light toward the substrate supported by the support member;
    a flash lamp for emitting light toward the substrate supported by the support member;
    a first lighting control unit for controlling the lighting of the flash lamp after a predetermined time has elapsed since the time of lighting the LED elements; and
    a second lighting control unit for reducing the power supplied to the LED elements before the first lighting control unit controls the lighting of the flash lamp.

2. The optical heating device according to claim 1, wherein the chamber includes a light transmissive window on the wall thereof to allow light for heating to enter inside the chamber;
    the support member supports the substrate to face the main surface of the substrate and the light transmissive window each other; and
    a plurality of the LED elements and the flash lamp are disposed to emit light from outside the chamber toward the main surface of the substrate supported by the support member through the light transmissive window.

3. The optical heating device according to claim 1, wherein a plurality of the LED elements emit light toward one of the main surfaces of the substrate supported by the support member; and the flash lamp emits light toward the other main surface of the substrate supported by the support member.

4. The optical heating device according to claim 3, wherein the chamber includes a pair of transmissive windows facing each other for allowing light for heating to enter inside the chamber;
    the support member supports the substrate to face each of the main surfaces of the substrate and the pair of transmissive windows each other; and
    a plurality of the LED elements and the flash lamp are disposed to emit light from outside the chamber toward the main surface of the substrate supported by the support member through the light transmissive window.

5. The optical heating device according to claim 1, further comprising a radiation thermometer for measuring a temperature of the main surface of the substrate,
    wherein, after lighting the LED elements, the first lighting control unit controls the lighting of the flash lamp after a predetermined time has elapsed since the time when the temperature of the main surface of the substrate measured by the radiation thermometer reaches a predetermined temperature.

6. The optical heating device according to claim 2, further comprising a radiation thermometer for measuring a temperature of the main surface of the substrate,
    wherein, after lighting the LED elements, the first lighting control unit controls the lighting of the flash lamp after a predetermined time has elapsed since the time when the temperature of the main surface of the substrate measured by the radiation thermometer reaches a predetermined temperature.

7. The optical heating device according to claim 3, further comprising a radiation thermometer for measuring a temperature of the main surface of the substrate,
    wherein, after lighting the LED elements, the first lighting control unit controls the lighting of the flash lamp after a predetermined time has elapsed since the time when the temperature of the main surface of the substrate measured by the radiation thermometer reaches a predetermined temperature.

8. The optical heating device according to claim 4, further comprising a radiation thermometer for measuring a temperature of the main surface of the substrate,
    wherein, after lighting the LED elements, the first lighting control unit controls the lighting of the flash lamp after a predetermined time has elapsed since the time when the temperature of the main surface of the substrate measured by the radiation thermometer reaches a predetermined temperature.

9. The optical heating device according to claim 5,
    wherein the second lighting control unit controls the current supplied to the LED elements based on the temperature measured by the radiation thermometer, and starts supplying the same current to each of the LED elements for lighting the LED elements; and
    after lighting the LED elements, based on the temperature distribution on the main surface of the substrate measured by the radiation thermometer, the second lighting control unit controls to decrease the current supplied to the LED element that irradiates an area with light where the highest temperature is exhibited among the temperature distribution, or controls to increase the current supplied to the LED element that irradiates an area with light where the lowest temperature is exhibited among the temperature distribution, and to decrease the power supplied to the LED elements before the first lighting control unit controls the lighting of the flash lamp.

10. The optical heating device according to claim 1, wherein the substrate is a semiconductor substrate or a glass substrate.

11. The optical heating device according to claim 1, wherein the light emitted by a plurality of the LED elements has a main emission wavelength in the range from 300 nm to 1050 nm.

12. The optical heating device according to claim 2, wherein the light emitted by a plurality of the LED elements has a main emission wavelength in the range from 300 nm to 1050 nm.

13. The optical heating device according to claim 3, wherein the light emitted by a plurality of the LED elements has a main emission wavelength in the range from 300 nm to 1050 nm.

14. The optical heating device according to claim 4, wherein the light emitted by a plurality of the LED elements has a main emission wavelength in the range from 300 nm to 1050 nm.

15. The optical heating device according to claim 5, wherein the light emitted by a plurality of the LED elements has a main emission wavelength in the range from 300 nm to 1050 nm.

16. The optical heating device according to claim 6, wherein the light emitted by a plurality of the LED elements has a main emission wavelength in the range from 300 nm to 1050 nm.

17. The optical heating device according to claim 7, wherein the light emitted by a plurality of the LED elements has a main emission wavelength in the range from 300 nm to 1050 nm.

18. The optical heating device according to claim 8, wherein the light emitted by a plurality of the LED elements has a main emission wavelength in the range from 300 nm to 1050 nm.

19. A method of heating treatment for a substrate, the method comprising:
- a step (A) of accommodating the substrate in a chamber;
- a step (B) of lighting a plurality of LED elements emitting light toward the substrate accommodated in the chamber;
- a step (C) of lighting a flash lamp emitting light toward the substrate, after the step (B), after a predetermined time has elapsed; and
- a step (D) of reducing the power supplied to the LED elements before the step (C) of lighting of the flash lamp.

20. The method of heating treatment according to claim 19, wherein the step (C) includes a step of lighting the flash lamp, after starting the step (B), after a predetermined time has elapsed since the time when the temperature of the main surface of the substrate measured by the radiation thermometer reaches a predetermined temperature.

* * * * *